(12) United States Patent
Togami et al.

(10) Patent No.: US 7,422,481 B2
(45) Date of Patent: Sep. 9, 2008

(54) ELECTROMAGNETIC INTERFERENCE CONTAINMENT IN A TRANSCEIVER MODULE

(75) Inventors: Chris Togami, San Jose, CA (US); Gary D. Sasser, San Jose, CA (US); Andy Engel, Portola Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/689,379

(22) Filed: Mar. 21, 2007

(65) Prior Publication Data

US 2007/0224851 A1 Sep. 27, 2007

Related U.S. Application Data

(60) Provisional application No. 60/784,801, filed on Mar. 22, 2006.

(51) Int. Cl.
*G02B 6/42* (2006.01)
(52) U.S. Cl. ............... 439/607; 439/95; 385/92; 361/816
(58) Field of Classification Search ........... 439/607, 439/95, 939; 385/92, 88; 361/816, 800, 361/802
See application file for complete search history.

(56) References Cited

U.S. PATENT DOCUMENTS

| | | | |
|---|---|---|---|
| 5,321,372 A | 6/1994 | Smith | |
| 6,178,096 B1 * | 1/2001 | Flickinger et al. | 361/816 |
| 6,335,869 B1 * | 1/2002 | Branch et al. | 361/816 |
| 6,439,918 B1 | 8/2002 | Togami et al. | |
| 6,459,517 B1 | 10/2002 | Duncan et al. | |
| 6,502,998 B2 * | 1/2003 | Yen et al. | 385/88 |
| 6,533,603 B1 | 3/2003 | Togami | |
| 6,705,879 B2 * | 3/2004 | Engel et al. | 439/76.1 |
| 6,752,663 B2 * | 6/2004 | Bright et al. | 439/607 |
| 6,817,782 B2 | 11/2004 | Togami et al. | |
| 6,953,289 B2 | 10/2005 | Togami et al. | |
| 7,111,994 B2 * | 9/2006 | Schwiebert et al. | 385/92 |
| 7,150,653 B1 * | 12/2006 | Mason | 439/609 |
| 2002/0110338 A1 * | 8/2002 | Dair et al. | 385/92 |

(Continued)

OTHER PUBLICATIONS

Small Form-factor Pluggable (SFP) Transceiver Multisource Agreement (MSA), Cooperation Agreement for Small-Form-factor Pluggable Transeivers, Agilent Technologies, et al., Sep. 14, 2000.

(Continued)

*Primary Examiner*—Gary F. Paumen
(74) *Attorney, Agent, or Firm*—Workman Nydegger

(57) ABSTRACT

A transceiver module that utilizes an electromagnetic interference (EMI) containment structure for dealing with electromagnetic interference generated within the transceiver module. In one example embodiment, a transceiver module includes a housing, a printed circuit board disposed within the housing, and an EMI shield disposed about the printed circuit board. In this example embodiment, the printed circuit board includes electronic circuitry and a plurality of differential signal lines. Further, the EMI shield includes a body having a slot, a plurality of fingers on at least one edge of the body, and tabs that are operative to connect the body to the printed circuit board. The slot of the EMI shield receives the printed circuit board such that the differential signal lines of the printed circuit board pass through the slot. The fingers of the EMI shield enable the body to maintain a biased contact with the housing.

20 Claims, 6 Drawing Sheets

U.S. PATENT DOCUMENTS

2003/0072540 A1* 4/2003 Huang .................. 385/92
2004/0161958 A1   8/2004 Togami et al.

OTHER PUBLICATIONS

Sasser et al., Grounding Via A Pivot Lever In A Transceiver Module, U.S. Appl. No. 11/688,753, filed Mar. 20, 2007.

Sasser et al., Grounding A Printed Circuit Board In A Transceiver Module, U.S. Appl. No. 11/689,351, filed Mar. 21, 2007.

Engel et al., Connector Structure For A Transceiver Module, U.S. Appl. No. 11/689,403, filed Mar. 21, 2007.

* cited by examiner

# ELECTROMAGNETIC INTERFERENCE CONTAINMENT IN A TRANSCEIVER MODULE

CROSS-REFERENCE TO RELATED APPLICATIONS

This application claims priority to U.S. Provisional Patent Application Ser. No. 60/784,801, filed on Mar. 22, 2006, which is incorporated herein by reference in its entirety.

BACKGROUND OF THE INVENTION

1. The Field of the Invention

The present invention relates generally to transceiver modules. More particularly, embodiments of the invention relate to an electromagnetic interference containment structure for reducing electromagnetic interference radiated from a transceiver module.

2. The Related Technology

Transceiver modules often include one or more printed circuit boards with electronic circuitry. The electronic circuitry of a printed circuit board can create electromagnetic interference. Electromagnetic interference, or EMI, is electromagnetic radiation that can be emitted by electrical circuits carrying rapidly changing signals. EMI is produced as a byproduct of the normal operation of the electrical circuitry of a printed circuit board in a transceiver module. EMI can cause unwanted signals (also known as interference or noise) to be induced in other electronic circuitry of the transceiver module and also in any copper cabling that is electrically connected to the transceiver module.

Transceiver modules must comply with governmental regulations concerning EMI, such as the United States Federal Communication Commission's Part 15, Class A. Beyond causing transceiver modules to be non-compliant with governmental regulations, unintentionally introduced EMI, can interrupt, obstruct, or otherwise degrade or limit the effective performance of a transceiver module or other nearby electronic circuits.

In light of the above discussion, a need currently exists for a transceiver module that includes an electromagnetic interference containment structure for reducing electromagnetic interference radiated from the transceiver module.

BRIEF SUMMARY OF SOME EXAMPLE EMBODIMENTS

In general, embodiments of the invention are concerned with a transceiver module, such as a copper transceiver module, that utilizes an electromagnetic interference (EMI) containment structure for dealing with electromagnetic interference generated within the transceiver module.

In one example embodiment, a transceiver module includes a housing, a printed circuit board disposed within the housing, and an EMI shield disposed about a portion of the printed circuit board. In this example embodiment, the housing is operative to be electrically connected to chassis ground. Also, the printed circuit board includes electronic circuitry and a plurality of differential signal lines. Further, the EMI shield includes a body having a slot, a plurality of fingers on at least one edge of the body, and tabs that are operative to connect the body to the printed circuit board. The slot of the EMI shield receives the portion of the printed circuit board such that the differential signal lines of the printed circuit board pass through the slot. The fingers of the EMI shield enable the body to maintain a biased contact with the housing.

In another example embodiment, a transceiver module includes a housing, a connector structure at least partially disposed within the housing, a printed circuit board electrically connected to the connector structure and at least partially disposed within the housing, and an EMI shield disposed about a portion of the printed circuit board. In this example embodiment, the housing is at least partially formed from electrically conductive material and the printed circuit board including electronic circuitry and at least one differential signal line. Also, the EMI shield includes a body having a slot and a plurality of fingers on at least one edge of the body. A portion of the printed circuit board is disposed in the slot such that the at least one differential signal line of the printed circuit board passes through the slot. Further, the fingers enable the body to maintain a biased contact with the housing.

These and other aspects of example embodiments of the present invention will become more fully apparent from the following description and appended claims.

BRIEF DESCRIPTION OF THE DRAWINGS

To further clarify aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Example embodiments of the present invention relate to a transceiver module, such as a copper transceiver module, that utilizes an electromagnetic interference (EMI) containment structure for dealing with electromagnetic interference generated within the transceiver module. While described in the context of copper transceiver modules used in the field of communications networking, it will be appreciated that example embodiments of the present invention are applicable to other applications as well. For example, other types of transceiver modules, both electronic and opto-electronic, could utilize embodiments of the structure for providing EMI containment within the transceiver modules.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

In the following description, numerous specific details are set forth in order to provide a thorough understanding of example embodiments of the present invention. It will be obvious, however, to one skilled in the art, that the example embodiments of the present invention may be practiced without these specific details. In other instances, well-known aspects of transceiver modules have not been described in great detail in order to avoid unnecessarily obscuring example embodiments of the present invention.

I. Example Transceiver Module

Figure 1:
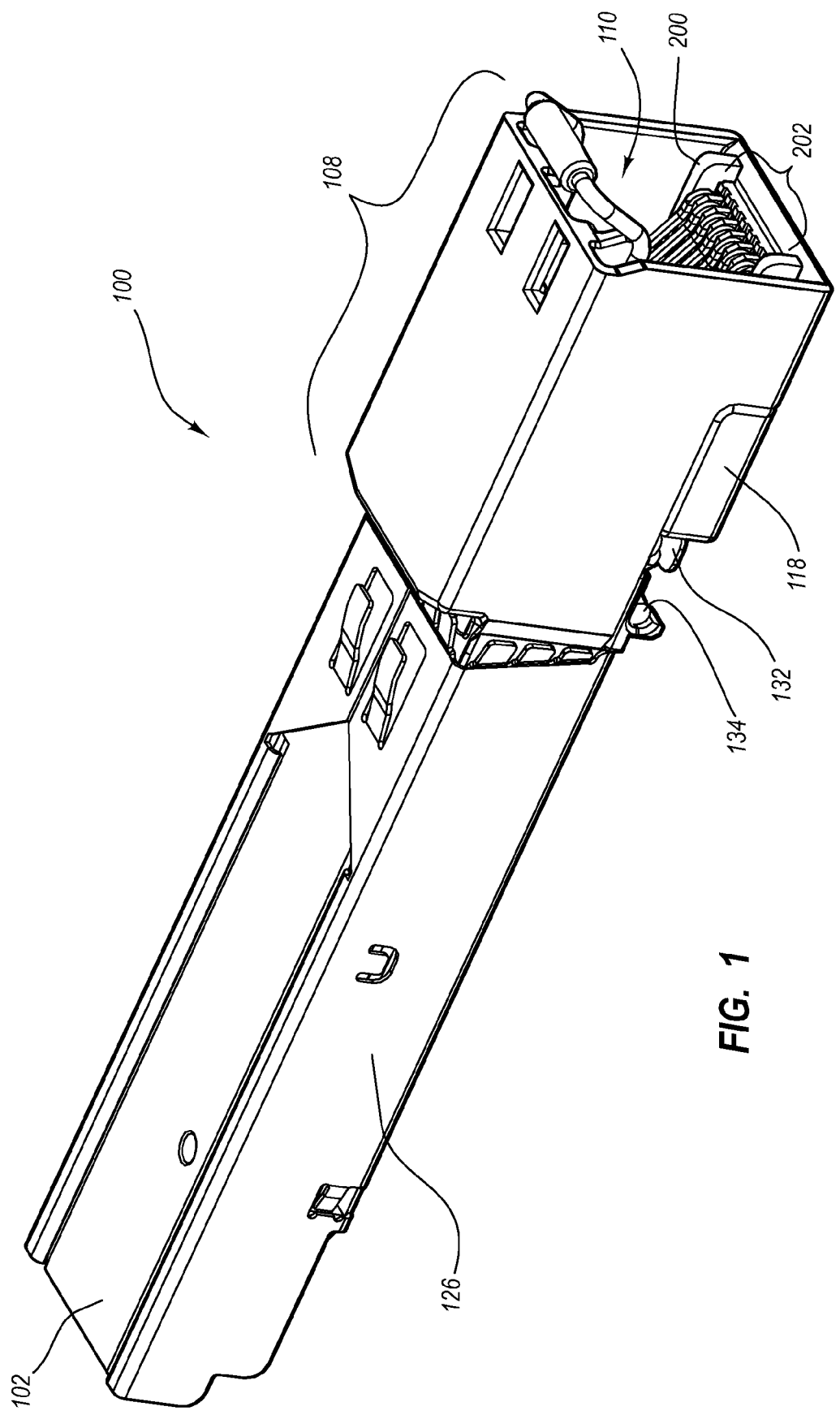
FIG. 1 is a perspective view of one example embodiment of an assembled transceiver module.
Figure 2:
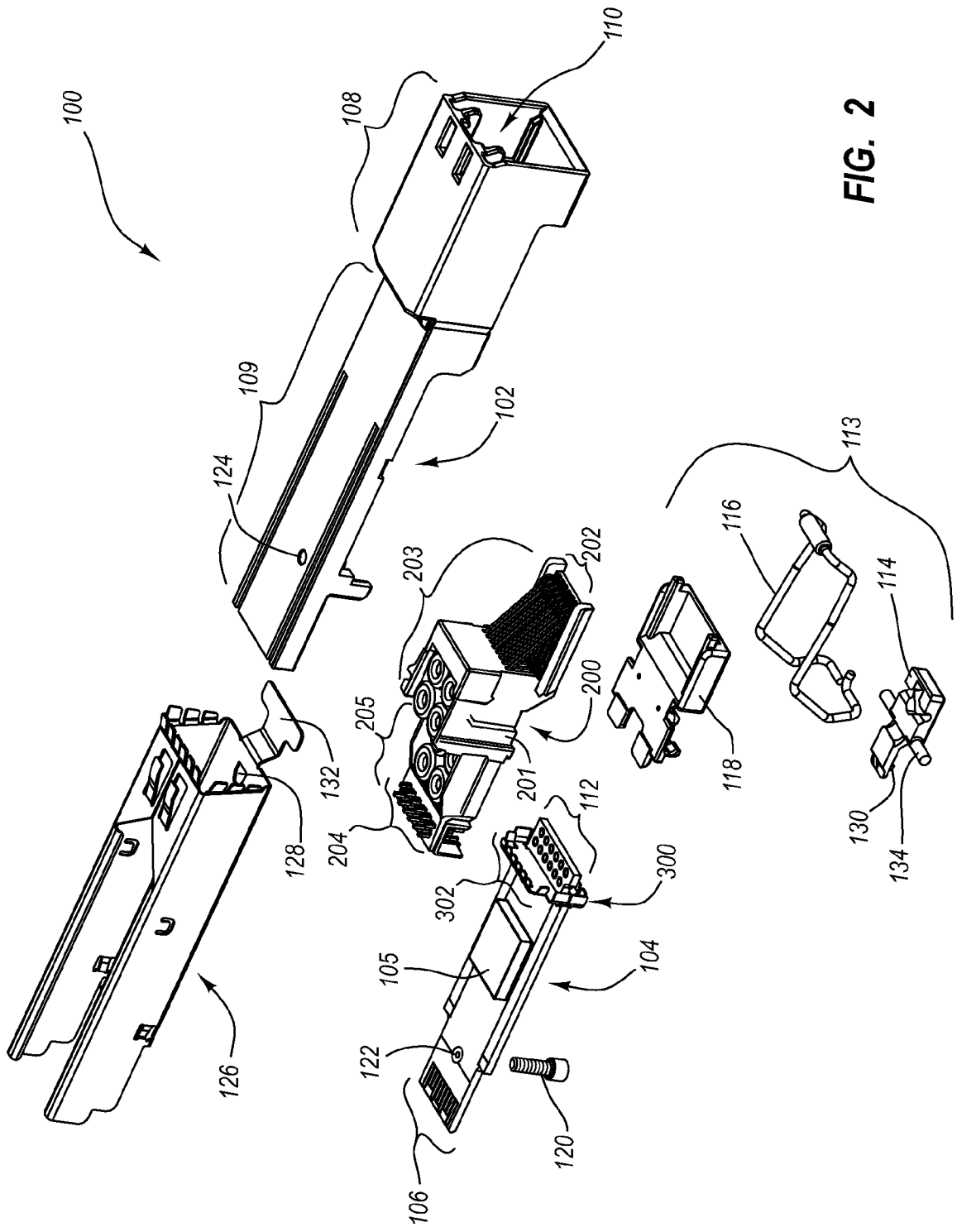
FIG. 2 is an exploded perspective view of the transceiver module of FIG. 1 including an example EMI shield and an example printed circuit board.

Reference is first made to FIGS. 1 and 2 together, which disclose perspective views of one example embodiment of a copper transceiver module, designated generally at 100. The transceiver module 100 has a low profile. Further, a portion of the transceiver module 100 that is configured to be positioned within a host port (not shown) substantially complies with existing industry standards specified in the Small Form-factor Pluggable (SFP) Transceiver MultiSource Agreement (MSA). Transceiver module 100 achieves data rates of 1.25 Gb/s, supports the 1000Base-T transmission standard (also known as the IEEE 802.3ab standard), operates between −40° C and 85° C, and is pluggable. Aspects of example embodiments of the present invention can be implemented in transceiver modules having other data rates, transmission standards, and operating temperatures. Likewise, aspects of example embodiments of the present invention can be implemented in transceiver or other communication modules that are not pluggable.

In the disclosed example, the transceiver module 100 includes an elongated base, designated generally at 102, that is configured to support and retain a first printed circuit board 104. In this example, the printed circuit board 104 accommodates various electronic components 105 positioned thereon, and it can include differing components and circuitry configurations, depending on the type of transceiver module in which it is implemented. Also formed on the printed circuit board 104 at a rear end is an exposed edge connector 106. The edge connector 106 is configured to be electrically compatible with a corresponding electrical connector (not shown) that is positioned within the port of a host device (not shown). Other connector schemes that are well known in the art could also be used in the transceiver module 100.

In the disclosed example embodiment, the base 102 can generally be divided into a connector portion, designated generally at 108, and a host port portion, designated generally at 109. The connector portion 108 is positioned at one end of the base 102 of the transceiver module 100. The connector portion 108 of the base 102 is generally the portion of the transceiver module 100 that remains on the outside of a host device (not shown) when the host port portion 109 of the base 102 and the housing 126 are operably positioned within a port of the host device (not shown). The connector portion 108 also defines an RJ-45 jack 110 that is configured to operatively receive a corresponding RJ-45 plug (not shown) of a typical copper communications cable. Other examples of jack and plug configurations include, but are not limited to, jacks and plugs compliant with registered jack ("RJ") standards such as RJ-11, RJ-14, RJ-25, RJ-48, and RJ-61 standards. The RJ-45 standard is commonly used in conjunction with a copper communications cable. Examples of copper communications cables include, but are not limited to, Category 5 ("CAT-5") cables, CAT-5e cables, and CAT-6 cables. It will be appreciated that the jack 110 could be implemented to accommodate any one of a number of different connector configurations, depending on the particular application involved.

The transceiver module 100 further includes a connector structure 200. The connector structure 200 fits within the base 102. The connector structure 200 includes a first set of conductive elements 202 that are configured to make electrical connection to a corresponding set of electrical elements on an RJ-45 plug (not shown) when the RJ-45 plug is inserted into the RJ-45 jack 110. The connector structure 200 also includes a second set of conductive elements 204 that are configured to electrically connect with a corresponding set of plated through holes 112 on the printed circuit board 104.

The transceiver module 100 also includes a latch mechanism 113, which is made up of a pivot block 114, a bail 116, and a mounting plate 118. In one example embodiment, the latch mechanism 113 provides several functions. First, the latch mechanism 113 provides a mechanism for "latching" the transceiver module 100 within a host port (not shown) when the transceiver module 100 is operatively received within the host port. Moreover, the latch mechanism 113 also provides a convenient means for extracting the transceiver module 100 from the host port, without the need for a special extraction tool. The latch mechanism 113 is preferably implemented so as to substantially preserve the small form factor of the transceiver module 100 in accordance with prevailing standards, and in a manner that allows convenient insertion and extraction of a single module from a host port without disturbing adjacent modules or adjacent copper communications cables—even when used in a host having a high port density. Also, in an example embodiment, the latch mechanism 113 precludes inadvertent extraction of the transceiver module 100 from the host port when an RJ-45 plug (not shown) is operatively received within, or extracted from, the RJ-45 jack 110.

The mounting plate 118 includes mounting and pivot components for use in operatively interconnecting the pivot block 114, the bail 116 and the module 100. The function of the pivot block 114 and the bail 116 with respect to the mounting plate 118 within the transceiver module 100 is substantially similar to the function and operation of a pivot block 310 and a bail 308 with respect to a mounting plate 314 within a module 300 as disclosed in connection with FIGS. 5 and 6 of U.S. Patent Application Publication No. "2004/0161958 A1" titled "Electronic Modules Having Integrated Lever-Activated Latching Mechanisms," published Aug. 19, 2004, which is incorporated herein by reference in its entirety.

FIGS. 1 and 2 also disclose how the base 102 and the printed circuit board 104 are at least partially enclosed and retained within a housing, designated generally at 126. The housing 126 is generally rectangular in cross-sectional shape so as to accommodate the base 102. The housing 126 includes an opening at its rear end so as to expose the edge connector 106 and thereby permit it to be operatively received within a corresponding electrical connector slot (not shown) within a host port of a host device (not shown). In one example embodiment, the housing 126 is formed of a conductive material such as sheet metal.

In an example embodiment, the housing 126 is configured so as to accommodate the latch mechanism 113 of the module 100. For example, a bottom surface of the housing 126 includes a locking recess 128, which is sized and shaped to expose a lock pin 130 of the pivot block 114 when the latch mechanism 113 is assembled within the transceiver module 100 and is in a latched position. Also, the housing 126 includes a means for biasing the latching mechanism to a latched position. By way of example, in one example embodiment, the biasing means is a resilient metal portion of the housing that is formed as a leaf spring 132. When the transceiver module 100 is operably assembled, the leaf spring 132 is biased against a top surface of the pivot block 114 so as to operatively secure the pivot block 114 in its assembled position. Also, the biasing action is applied so as to urge the pivot block 114 in a rotational direction about a pivot point 134 so as to expose the lock pin 130 through the locking recess 128. This corresponds to the transceiver module 100 being in a latched position.

In addition, as disclosed in FIG. 2, the transceiver module 100 includes an EMI shield 300 that is configured so as to circumscribe a portion of the printed circuit board 104. The EMI shield 300 is generally rectangular in shape and includes fingers 302 that extend outward from each edge of the EMI shield 300. The fingers 302 are sized and configured so that when the plated through holes 112 of the printed circuit board 104 are operably connected to the conductive elements 204 of the connector structure 200, with the connector structure 200 and the printed circuit board 104 operably assembled within the base 102 and the housing 126, the fingers 302 are physically biased against the base 102 and the housing 126 of the transceiver module 100. In detail, the fingers 302 on the top edge of the EMI shield 300 are biased against the base 102 and the fingers 302 on the side edges and bottom edge of the EMI shield 300 are biased against the housing 126. This biasing of the fingers 302 against the base 102 and the housing 126 assures that the fingers 302 will reliably remain in constant electrical contact with the base 102 and the housing 126 despite minor variances in the size or positioning of the printed circuit board 104, the base 102, and/or the housing 126. Likewise, the fingers 302 are constructed from a resilient conductive material, such as sheet metal, that will keep the fingers 302 in constant electrical contact with the base 102 and the housing 126 despite minor spacing variations between the printed circuit board 104, the base 102, and/or the housing 126.

The housing 126 is made from an electrically conductive material, as is the base 102. Therefore, after the assembly of the module 100, when the base 102 and the housing 126 are grounded, for example to chassis ground, the EMI shield 300 is also necessarily grounded because of the secure electrical attachment of the fingers 302 to the housing 126 and the base 102. The printed circuit board 104 is also secured to the base 102 with a fastener 120 which passes through an opening 122 in the printed circuit board 104 and into an opening 124 in the base 102.

II. Example EMI Shield

Figure 3A:
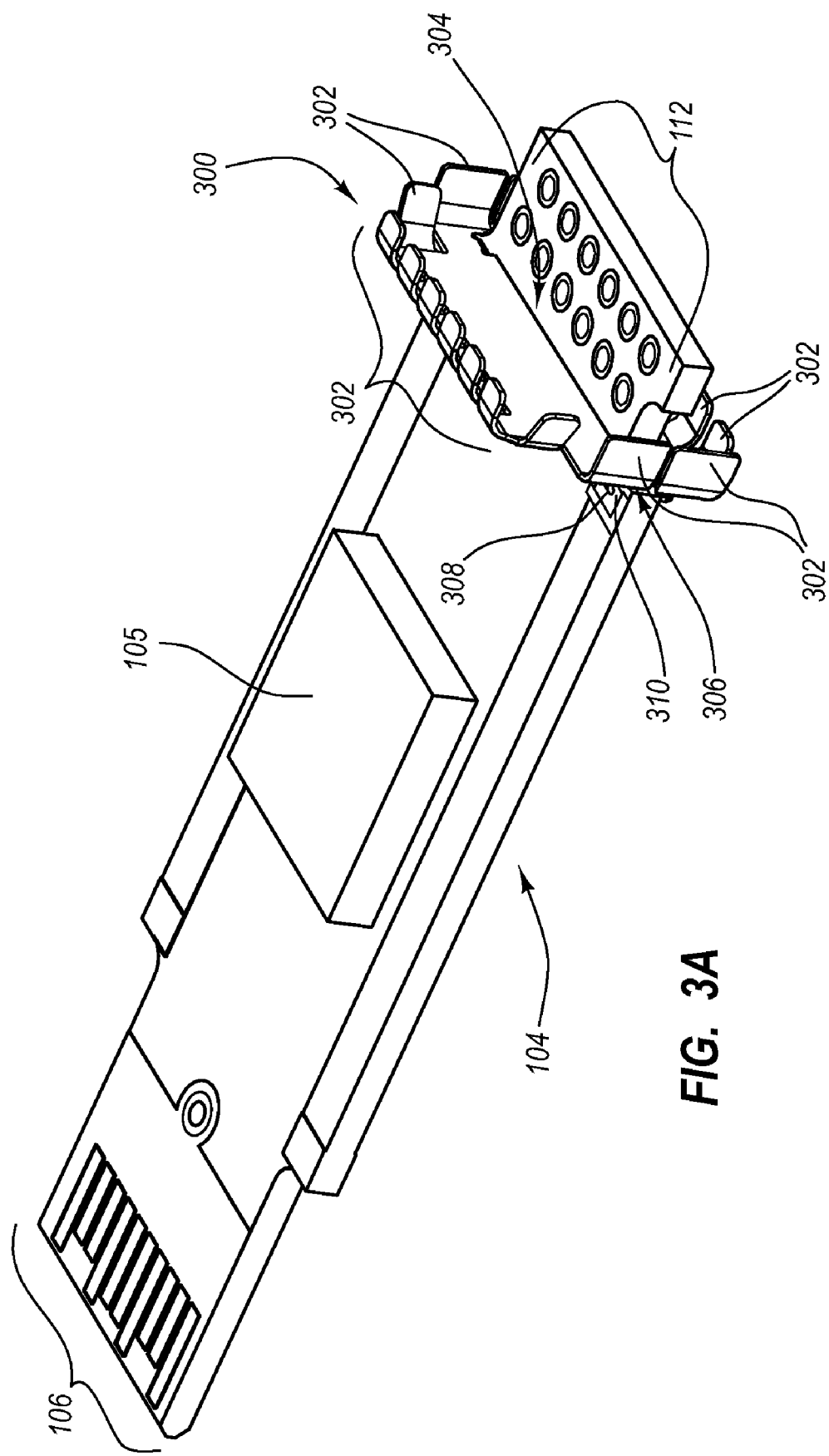
FIG. 3A is a front perspective view of the EMI shield and printed circuit board of FIG. 2.
Figure 3B:
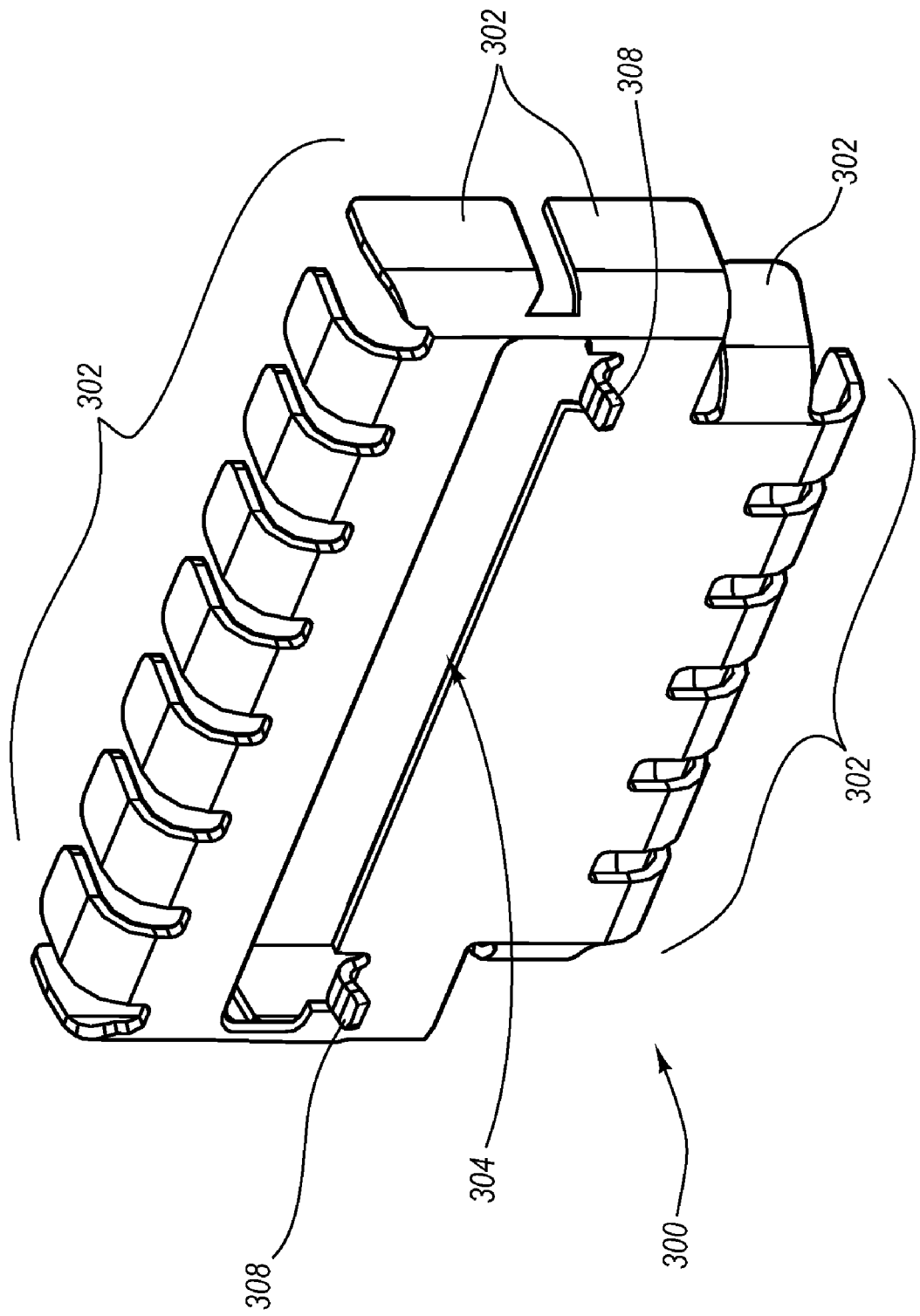
FIG. 3B is a upside-down rear perspective view of the EMI shield of FIG. 2.

Reference is now made to FIGS. 3A and 3B, which disclose perspective views of the example EMI shield 300 of FIG. 2, in describing further details regarding the EMI shield 300. As discussed previously, the EMI shield 300 includes the fingers 302 along each outside edge of the EMI shield 300. The EMI shield 300 also includes a generally centrally located slot 304 which enables the EMI shield 300 to be slipped over the front edge of the printed circuit board 104 during assembly.

As disclosed in FIGS. 3A and 3B, the slot 304 of the EMI shield 300 can be configured to closely correspond in size and shape to the cross-sectional size and shape of the printed circuit board 104 at the point on the board where the EMI shield 300 rests after the EMI shield 300 is positioned on the printed circuit board 104. This close similarity of size between the slot 304 and the printed circuit board 104 reduces spacing gaps between the printed circuit board 104 and the EMI shield 300, which in turn provides for improved EMI protection within the transceiver module 100.

After the EMI shield 300 is slipped onto the printed circuit board 104 adjacent to the plated through holes 112, the EMI shield 300 is secured to the printed circuit board 104 so that the EMI shield 300 is optimally positioned when the printed circuit board 104 is assembled within the base 102 and the housing 126. As disclosed in FIGS. 3A and 3B, the EMI shield 300 includes two tabs 308 which extend out of the rear side of the EMI shield 300. The tabs 308 can be used to secure the EMI shield 300 to the printed circuit board 104. The tabs 308 correspond to two copper pads 310 positioned on the top side of the printed circuit board 104. The pads 310 are not electronically connected to any other electrical connections or components of the printed circuit board 104. Alternatively, the pads 310 can be connected to signal ground in order to tie in to common ground. A second alternative is for the pads 310 to be capacitively connected to signal ground, either through discrete components mounted on the printed circuit board 104 or through capacitive structures built into the printed circuit board 104.

The tabs 308 and the pads 310 are positioned so that the tabs 308 can be soldered to the pads 310. Soldering the tabs 308 to the pads 310 secures the EMI shield 300 to the printed circuit board 104. Alternatively, the securing of the EMI shield 300 to the printed circuit board 104 can be accomplished in a number of different ways including, but not limited to, using a through hole, pinning, swaging, press fitting, or soldering the EMI shield 300 to an intermediate piece that is secured to the printed circuit board 104. Other methods of securing the EMI shield 300 in place with respect to the printed circuit board 104 are also possible.

Figure 3C:
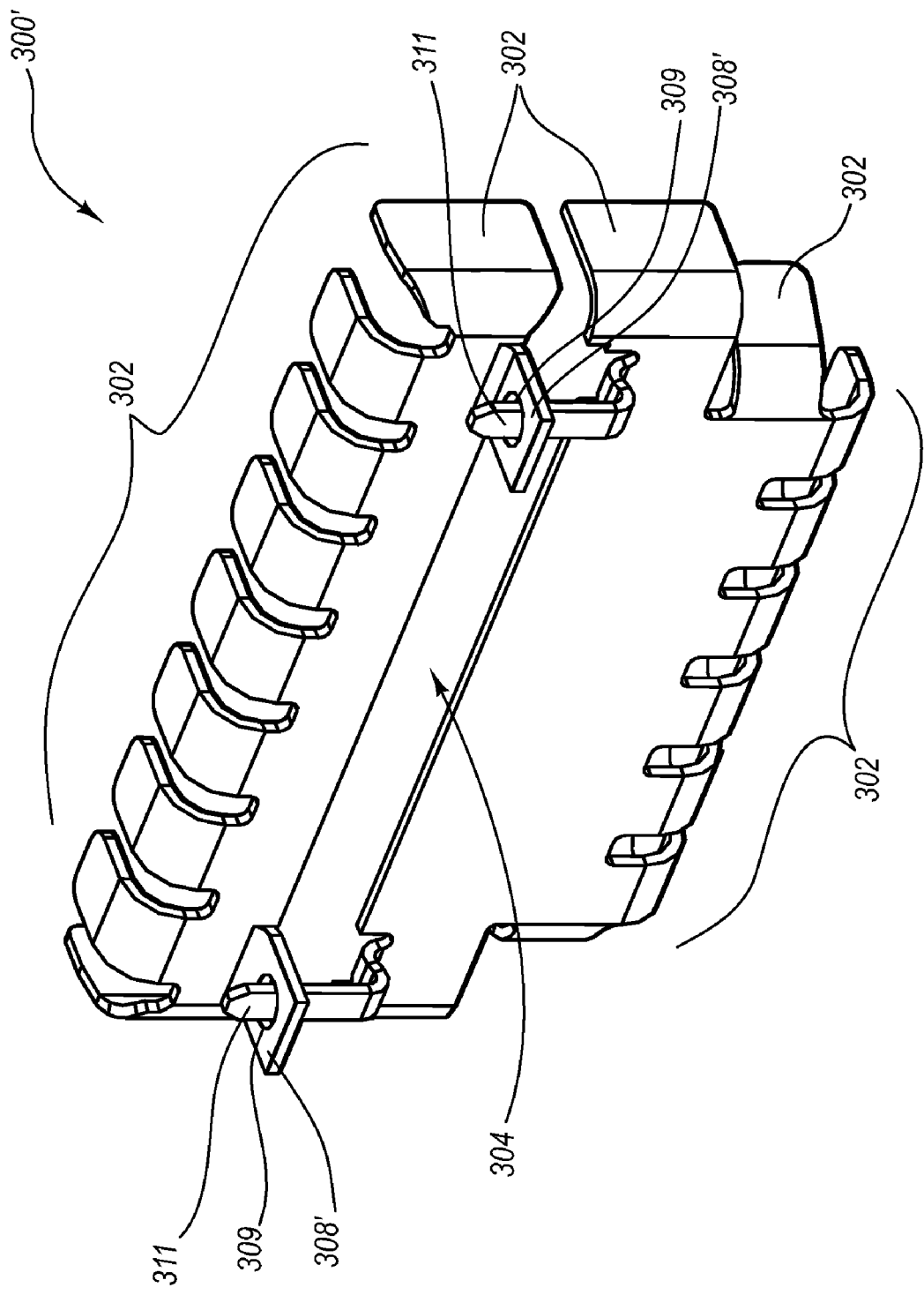
FIG. 3C is an upside-down rear perspective view of an example alternative embodiment of the EMI shield of FIG. 2.

As disclosed in FIGS. 2 and 3, the EMI shield 300 is positioned adjacent to the plated through holes 112 on the printed circuit board 104. The positioning of the EMI shield 300 on the printed circuit board 104 is significant because the EMI shielding of the EMI shield 300 is maximized when the EMI shield 300 is positioned between the electronic circuitry 105 of the printed circuit board 104 and the connector structure 200 within the transceiver module 100. Alternatively, depending on the positioning of electronic circuitry 105 on the printed circuit board 104, the EMI shield could be positioned further away from the plated through holes 112 and closer to the edge connector 106. For example, if most or all of the electronic circuitry 105 of the printed circuit board 104 are positioned close to the edge connector 106, in one example embodiment of the invention, the EMI shield 300 could be positioned further away from the plated through holes 112 and closer to the edge connector 106.

In the example embodiment disclosed in FIGS. 3A and 3B, the body of the EMI shield 300 is integrally formed as a single monolithic piece. However, the body of the EMI shield 300 can alternatively be formed from multiple pieces. For example, with reference now to FIG. 3C, an alternative embodiment of the EMI shield 300 is disclosed, denoted generally at 300'. The alternative EMI shield 300' is similar to the EMI shield 300 except that the alternative tabs 308' are configured to extend through the pads 310 of the printed circuit board 104. As such, the alternative EMI shield 300' requires that the pads 310 of the printed circuit board 104 include holes (not shown) corresponding to the alternative tabs 308'. The alternative EMI shield 300' also includes flanges 311 that define holes 309 through which the alternative tabs 308' are configured to extend. The flanges 311 and the alternative tabs 308' of the alternative EMI shield 300' and the pads 310 of the printed circuit board 104 can be mechanically connected to one another in a number of different ways including, but not limited to, those listed above.

In another example embodiment, an EMI shield can alternatively be configured as a U-shaped piece that can be slipped sideways onto the printed circuit board 104 during assembly.

In this alternative EMI shield, after the U-shaped EMI shield is slipped sideways onto the printed circuit board 104, the open end of the U-shaped EMI shield can be closed. For example, the open end of the U-shaped EMI shield can be closed at a point on the U-shaped EMI shield corresponding to a point 306 on the EMI shield 300. This closure of the open end of the U-shaped EMI shield can be accomplished in a number of different ways including, but not limited to, those listed above.

III. Example EMI Shield Function

Figure 4:
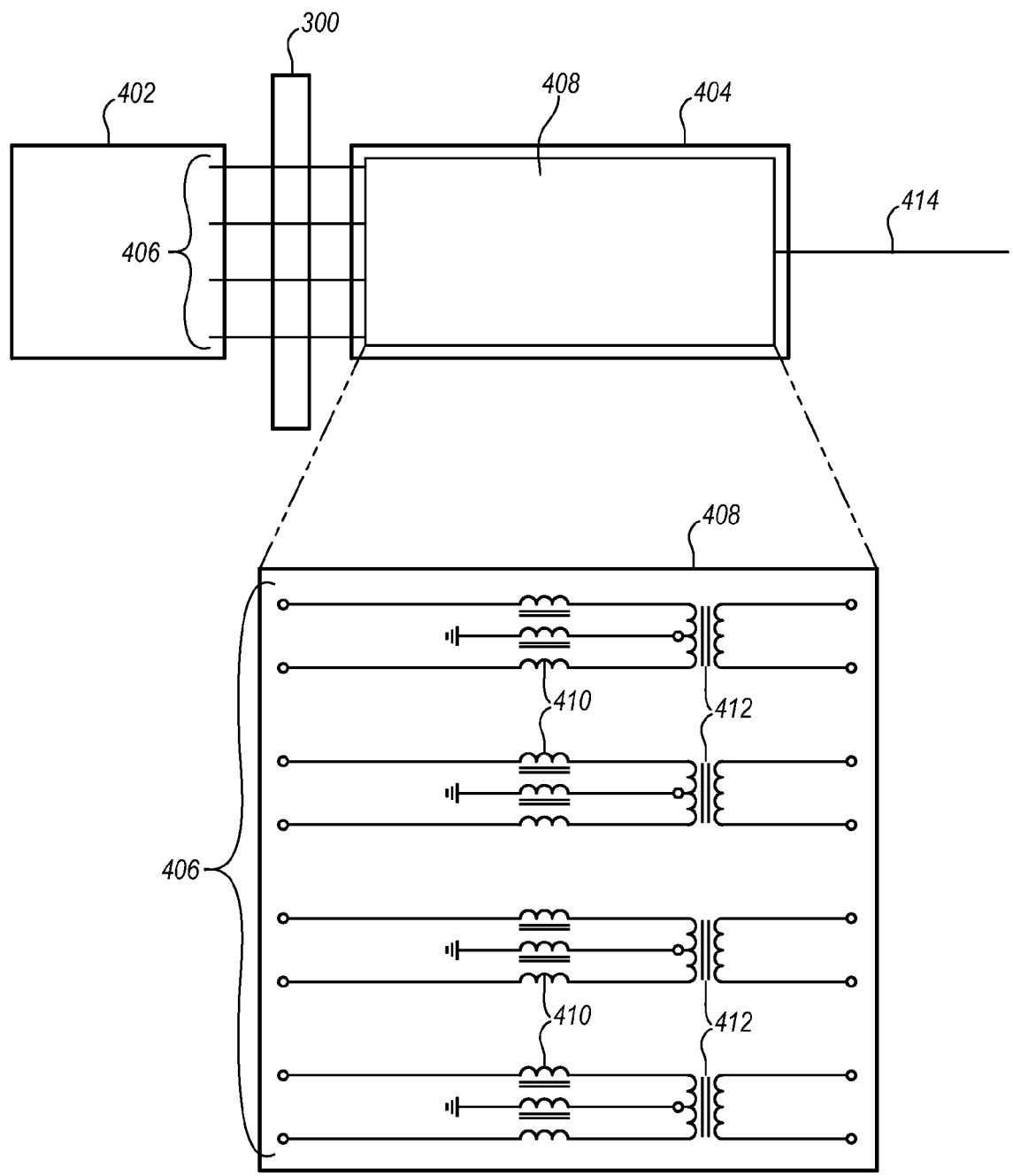
FIG. 4 is a schematic diagram of the function of the EMI shield shown in FIGS. 2 and 3.

FIG. 4 discloses a schematic diagram of the function of the EMI shield 300. A component 402 represents the electronic circuitry 105 of the printed circuit board 104. A component 300 represents the EMI shield 300. A component 404 represents the electronic circuitry of the connector structure 200. As disclosed in FIG. 4, four differential signal lines 406 printed on the printed circuit board 104 pass through the EMI shield 300 from the component 402 to the component 404. The EMI shield 300 functions to take any radiated energy from the component 402 and force the radiated energy onto the differential signal lines 406 that pass through the EMI shield 300. In practice, the differential signal lines 406 can pass through the slot 304 of the EMI shield 300, as disclosed in FIG. 3A. The radiated energy from the component 402 is forced onto the differential signal lines 406 as common mode energy. This common mode energy is then sent along the differential signal lines 406 until it encounters a component 408.

The component 408 includes each of the differential signal lines 406 passing through a common mode choke 410 and an isolation transformer 412. It is possible to have alternate configurations of the common mode chokes 410 and the isolation transformers 412 within the transceiver module 100, including swapping the position of the common mode choke 410 and the isolation transformer 412 on any one of the differential signal lines 406.

Each of the isolation transformers 412 provides a DC block between the copper communications cable 414 and the component 402. If high voltages are accidentally introduced on the copper communications cable 414, for example, through accidental shorting to a power line, then the DC block prevents large currents from flowing into the component 402 and posing a safety hazard.

Each of the common mode chokes 410 is designed to attenuate and suppress common mode line noise coming across each of the differential signal lines 406. By forcing all radiated energy from the printed circuit board 104 onto the differential signal lines 406, the EMI shield 300 funnels the radiated energy as common mode energy to the common mode chokes 410. In the absence of the EMI shield 300, some radiated energy from the component 402 could bypass the common mode chokes 410 and eventually end up as noise on a copper communications cable 414 that is electrically connected to the electronic circuitry of the connector structure 200 through the jack 110. The copper communications cable 414 is a very efficient radiator, and any EMI that reaches the copper communications cable 414 can radiate strongly enough to violate government regulations and interfere with other nearby electrical circuits. Therefore, the presence of the EMI shield 300 allows the common mode chokes 410 to function more effectively within the transceiver module 100 by avoiding the undesirable arrival of EMI on the copper communications cable 414. The EMI shield 300, therefore, enhances the electrical robustness of the transceiver module 100 and provides for improved electrical characteristics thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module for use in a communications network, the module comprising:
   a housing operative to be electrically connected to chassis ground;
   a printed circuit board disposed within the housing, the printed circuit board including electronic circuitry and a plurality of differential signal lines; and
   an EMI shield disposed about a portion of the printed circuit board, the EMI shield comprising:
      a body having a slot, the slot receiving the portion of the printed circuit board such that the differential signal lines of the printed circuit board pass through the slot;
      a plurality of fingers on at least one edge of the body; the fingers enabling the body to maintain a biased contact with the housing;
      tabs operative to connect the body to the printed circuit board.

2. The transceiver module as recited in claim 1, wherein a portion of the transceiver module that is configured to be positioned within a host port substantially conforms to the SFP Transceiver MSA.

3. The transceiver module as recited in claim 1, wherein the transceiver module is configured to achieve data rates of about 1.25 Gb/s.

4. The transceiver module as recited in claim 1, wherein the transceiver module substantially supports the 1000Base-T transmission standard.

5. The transceiver module as recited in claim 1, wherein the transceiver module is configured to operate between about −40° C. and 85° C.

6. The transceiver module as recited in claim 1, wherein the size and shape of the slot of the EMI shield is substantially the same as the cross-sectional size and shape of the portion of the printed circuit board received in the slot.

7. The transceiver module as recited in claim 1, wherein the tabs are connected to corresponding pads positioned on the printed circuit board.

8. The transceiver module as recited in claim 7, wherein the pads are not electronically connected to the electronic circuitry or the plurality of differential signal lines on the printed circuit board.

9. The transceiver module as recited in claim 7, wherein the pads are electrically connected to a signal ground in order to tie in common ground.

10. The transceiver module as recited in claim 7, wherein the pads are capacitively connected to signal ground, either through discrete components mounted on the printed circuit board or through capacitive structures built into the printed circuit board.

11. The transceiver module as recited in claim 1, wherein, after passing through the slot, at least one of the plurality of differential signal lines further passes first through a common mode choke and second through an isolation transformer.

12. The transceiver module as recited in claim 1, wherein, after passing through the slot, at least one of the plurality of differential signal lines further passes first through an isolation transformer and second through a common mode choke.

13. A transceiver module comprising:

a housing comprising electrically conductive material;

a connector structure at least partially disposed within the housing;

a printed circuit board electrically connected to the connector structure and at least partially disposed within the housing, the printed circuit board including electronic circuitry and at least one differential signal line; and an EMI shield disposed about a portion of the printed circuit board, the EMI shield comprising:

a body having a slot, the portion of the printed circuit board being disposed in the slot such that the at least one differential signal line of the printed circuit board passes through the slot; and a plurality of fingers on at least one edge of the body; the fingers enabling the body to maintain a biased contact with the housing.

14. The transceiver module as recited in claim 13, wherein a portion of the transceiver module that is configured to be positioned within a host port substantially conforms to the SFP Transceiver MSA.

15. The transceiver module as recited in claim 13, wherein the transceiver module substantially supports the 1000Base-T transmission standard.

16. The transceiver module as recited in claim 13, wherein the transceiver module is configured to operate between about −40° C. and 85° C.

17. The transceiver module as recited in claim 13, wherein the size and shape of the slot of the EMI shield is substantially the same as the cross-sectional size and shape of the portion of the printed circuit board received in the slot.

18. The transceiver module as recited in claim 13, wherein, after passing through the slot, the at least one differential signal line further passes first through a common mode choke and second through an isolation transformer.

19. The transceiver module as recited in claim 13, wherein, after passing through the slot, the at least one differential signal line further passes first through an isolation transformer and second through a common mode choke.

20. The transceiver module as recited in claim 13, wherein the EMI shield further comprises tabs that are soldered to the printed circuit board.

* * * * *